US010920841B2

(12) United States Patent
Lipparini et al.

(10) Patent No.: US 10,920,841 B2
(45) Date of Patent: Feb. 16, 2021

(54) DRIVE TRANSMISSION DEVICE FOR BRAKES

(71) Applicant: DROMOS S.R.L., Valsamoggia (IT)

(72) Inventors: Luca Lipparini, Zola Predosa (IT); Davide Barani, Valsamoggia (IT)

(73) Assignee: DROMOS S.R.L., Valsamoggia (IT)

( * ) Notice: Subject to any disclaimer, the term of this patent is extended or adjusted under 35 U.S.C. 154(b) by 108 days.

(21) Appl. No.: 15/831,966

(22) Filed: Dec. 5, 2017

(65) Prior Publication Data

US 2019/0017560 A1    Jan. 17, 2019

(30) Foreign Application Priority Data

Jul. 11, 2017    (IT) .......................... 102017000078227

(51) Int. Cl.
*F16D 65/22* (2006.01)
*F16D 65/00* (2006.01)
(Continued)

(52) U.S. Cl.
CPC .............. *F16D 65/22* (2013.01); *B60T 11/18* (2013.01); *F16D 65/0056* (2013.01);
(Continued)

(58) Field of Classification Search
CPC .. F16D 65/22; F16D 65/0056; F16D 2121/14; B60T 11/18; B60T 11/102; B60T 11/12; B60T 11/14
See application file for complete search history.

(56) References Cited

U.S. PATENT DOCUMENTS 4,596,315 A * 6/1986 Takeuchi ............... F16D 55/227
188/196 D
4,619,347 A * 10/1986 Schreiner ................ F16D 65/18
188/106 F
(Continued)

FOREIGN PATENT DOCUMENTS

DE    102005003886 A1    8/2006
DE    102007016975 A1    10/2008
(Continued)

OTHER PUBLICATIONS

EPO Translation of the Description of WO 2017/119328 A1, Kobayashi, Jul. 13, 2017. (Year: 2020).*
(Continued)

*Primary Examiner* — Daniel D Yabut
(74) *Attorney, Agent, or Firm* — Pearne & Gordon LLP

(57) ABSTRACT

A drive transmission device for brakes comprises a frame (2); a first rod (8) movable along a first direction (D1) and having a first end (8a) configured to be connected to an actuator (a) and a second end (8b), opposite the first end (8a); a second rod (9) movable along a second direction (D2), tilted with respect to the first direction (D1), and having a first end (9a) configured to be connected to a brake actuating member and a second end (9b), opposite the first end (9a); an oscillating element (10) having a first portion that is rotatably constrained to the frame (2) and a second portion movable along a circumferential arc trajectory; the second ends (8b, 9b) of the first (8) and of the second rod (9) being connected to the second portion of the oscillating element (10).

18 Claims, 4 Drawing Sheets

(51) Int. Cl.
- *F16D 51/00* (2006.01)
- *B60T 11/18* (2006.01)
- *F16D 121/02* (2012.01)
- *F16D 123/00* (2012.01)

(52) U.S. Cl.
CPC .... *F16D 2051/003* (2013.01); *F16D 2121/02* (2013.01); *F16D 2123/00* (2013.01)

(56) References Cited

U.S. PATENT DOCUMENTS

| | | | | |
|---|---|---|---|---|
| 4,784,245 | A | * | 11/1988 | Fabbro .................. F16D 65/567 |
| | | | | 188/196 D |
| 4,840,082 | A | * | 6/1989 | Terashima .............. B62L 3/023 |
| | | | | 74/523 |
| 4,872,368 | A | | 10/1989 | Porter |
| 2007/0164563 | A1 | * | 7/2007 | Arstein ................ F16L 19/061 |
| | | | | 285/249 |
| 2011/0162479 | A1 | | 7/2011 | Mori |

FOREIGN PATENT DOCUMENTS

| | | | |
|---|---|---|---|
| EP | 2343224 A2 | 7/2011 | |
| FR | 1281259 | 1/1962 | |
| JP | 2009132343 A * | 6/2009 | |
| WO | WO-2017119328 A1 * | 7/2017 | ................ B62L 3/00 |

OTHER PUBLICATIONS

EPO Translation of the Description of JP 200932343 A, Yamagishi, Jun. 18, 2009. (Year: 2020).*

* cited by examiner

DRIVE TRANSMISSION DEVICE FOR BRAKES

FIELD OF THE INVENTION

The object of the present invention is a drive transmission device for brakes, particularly a drum. Specifically, the present invention applies to the connection between an actuator, for example a pneumatic actuator, and a drum brake in an axle of agricultural machines, earth-moving machines and the like.

In detail, the present invention is applied in the connection between an actuator and a drum brake with a linear drive by a widening wedge.

Even more particularly, the present invention is advantageously applied in the axles of machines with two or four turning wheels.

DESCRIPTION OF RELATED ART

In known axles, the drum brakes comprise an actuating member, for example a wedge, that acts by moving the jaws against the drum when the actuating member is moved linearly along an actuating direction. Naturally, the wedge is connected to the actuator to be moved linearly. The actuator is connected, for example directly, to the brake at the hub of the wheel. In any case, the actuator has to be so arranged as to generate a force that is coaxial to the actuating direction of the brake.

It should be noted here that the actuator generally has significant dimensions as it is sized to exert an appropriate force to ensure the safe arrest of an agricultural machine or of an earth-moving machine.

According to what is known, the actuator thus has significant overall dimensions that limits, during the design step, correct positioning thereof. Further, with particular reference to the axles of turning wheels, the not negligible overall dimensions of the actuator also influences the turning radius of the machine.

In detail, it should be noted that the actuator is connected stiffly to the drum brake of the wheel and that, in the case of turning wheels, it moves by rotating integrally with the wheel of the machine.

In view of the fact that, in the machines herein considered, numerous other components are provided at the axle, it is clear that the great overall dimensions of the actuator limit the possibility of reducing the steering radius of the machine.

Nevertheless, machines of this type often operate in rough terrain and require a manoeuvrability as great as possible. Known brake-actuator coupling modes do not thus enable machines to be obtained with an appropriately reduced turning radius.

The object of the present invention is to provide a drive transmission device for brakes that avoids the problems described above.

In greater detail, the object of the present invention is to propose a drive transmission device for brakes that enables the turning radius of the machines on which it is fitted to be reduced.

The object of the present invention is achieved by a drive transmission device for brakes comprising the features of one or more of the appended claims.

SUMMARY OF THE INVENTION

According to the present invention, a drive transmission device for brakes comprises a frame, a first rod movable along a first direction and having a first end configured to be connected to an actuator and a second end, opposite the first end; a second rod that is movable along a second direction, tilted with respect to the first direction, and having a first end configured to be connected to a brake actuating member and a second end, opposite the first end; an oscillating element having a first portion that is rotatably constrained to the frame and a second portion movable along a circumferential arc trajectory; the second ends of the first and of the second rod being connected to the second portion of the oscillating element.

The solution according to the present invention enables the actuator to be removed from the brake and diverted with respect to the actuation direction of the brake.

In this manner, during the design step it is possible to arrange the actuator in a position that is such as to increase the movement stroke of the actuator itself at the same time as turning of the wheel. Accordingly, it is thus possible to reduce the turning radius of the machine.

According to a secondary aspect of the present invention, the oscillating element of the drive transmission device for brakes comprises a bar having a first end, which defines the first portion of the oscillating element, and a second end which defines the second portion of the oscillating element.

Using a bar as oscillating element enables the complexity of the device to be reduced, at the same time permitting effective transmission of the forces between the first and the second rod, owing to the monolithic structure that ensures great bar stiffness.

According to a secondary aspect of the present invention, the second ends of the first and of the second rod are in contact with the second end of the bar.

This solution permits a very simple coupling between the rods and the bars. This simplicity also enables the reliability of the drive transmission device for brakes of the invention to be increased noticeably.

Further, this coupling by contact permits effective transmission of the forces between the first and the second rod.

According to a secondary aspect of the present invention, the bar comprises at least a first and second seat, obtained at the second end of the bar; the second ends of the first and of the second rod being arranged respectively in the first and in the second seat.

In this manner, advantageously, the coupling in contact between the rods and the bar can be maintained stably. In fact, in this case, the ends of the rods are inserted into cavities that define the aforesaid seats and prevent the ends modifying the position thereof with respect to the bar or detaching therefrom, limiting or preventing operation of the device.

According to a secondary aspect of the present invention, the first and/or the second seat have a respective contact portion with the first and/or the second rod that is at least partially spherical; the second ends of the first and/or of the second rod having a respective contact portion with the first and/or the second seat that is at least partially spherical.

This solution in fact enables contact coupling between the rods and the bar to be facilitated, also improving the efficiency with which the forces are transmitted. Friction is in fact limited in the contact portions that would disperse part of the transmitted forces.

According to a secondary aspect of the present invention, the frame comprises a box-like body, containing the first and the second rod and the bar, and a cover reversibly connected to the box-like body; the cover being preferably parallel to the movement plane of the bar.

According to this solution, the rods and the bar are arranged inside a box-like body that is closed by a cover. The elements contained in the box-like body are thus protected from earth and dirt that could compromise the operation of the device. It is further possible to lubricate such components effectively by greasing.

Lastly, as the cover is connected to the box-like body reversibly, it can be removed whenever necessary to inspect the components in the box-like body, for example for maintenance or simple inspection.

According to a secondary aspect of the present invention, the frame has a hollow arranged at the second end of the bar and the second end of the bar is at least partially inserted into the hollow to move along the hollow.

This solution enables the device to operate even in an emergency situation, if a failure of the rotating constraint of the bar occurs. In other words, if the bar gets detached from the frame (for example, following breakage of a coupling pin), the bar tends to drop by gravity into the hollow, nevertheless maintaining a position substantially aligned with the first and with the second rod. In this manner, the bar is no longer rotatingly constrained to the frame and can anyway move in the hollow (and along the hollow), completing a braking procedure.

Further, even under normal operation, the hollow prevents abnormal and undesired movements of the bar in a direction that is transverse to a movement plane of the bar itself. In fact, during use, the machine on which the device is fitted works on rough terrain and considerable transverse forces can act on the bar. As the free end of the bar moves in the hollow, transverse flexing of the bar, which could compromise the correct operation of the device, is avoided.

According to a secondary aspect of the present invention, the box-like body and the cover have respective shoulders arranged at the second end of the bar to define the hollow there between. Advantageously, this feature enables the hollow to be made simply by machining of two distinct workpieces.

Further, also fitting of the bar in the hollow is simplified. In fact, the second end of the bar is enclosed in the hollow by simply arranging the cover in the box-like body, without any need to check the alignment of the bar with respect to the hollow during the fitting step.

According to a secondary aspect of the present invention, the frame comprises a conduit that is coaxial with the second direction to house the second rod. Further, the device comprises a coupling sleeve configured to be connected to the brake actuating member; the coupling sleeve is associated with the conduit by conical coupling.

This solution enables fitting of the device to the brake to be significantly simplified. In fact, during the fitting step, the sleeve is preliminarily coupled with the brake in a known manner and without any need to modify the brake to permit connection to the device of the invention.

Only subsequently is the remaining part of the drive transmission device for brakes of the invention connected to the sleeve with great simplicity. The conical coupling in fact enables self-centring of the sleeve and of the conduit of the frame, simplifying and accelerating the connection.

Further, the conical coupling enables the orientation of the device to be selected with respect to the brake in the fitting step or in the inspection and maintenance step.

According to a secondary aspect of the present invention, the device further comprises a locking member associated with the coupling sleeve to fix the coupling sleeve reversibly to the conduit. The locking member comprises preferably a ring nut that is threaded and associated with the coupling sleeve and screwed outside the conduit.

The locking member advantageously prevents the orientation of the device with respect to the brake being accidentally modified during use thereof.

Further, the use of a threaded ring nut enables the locking and unlocking operation to be simplified and accelerated, further simplifying the operation of modifying this orientation, when desired.

BRIEF DESCRIPTION OF THE DRAWINGS

Within the scope of the present description, reference shall be made to the appended drawings in which.

DETAILED DESCRIPTION OF PREFERRED EMBODIMENTS OF THE INVENTION

Figure 1:
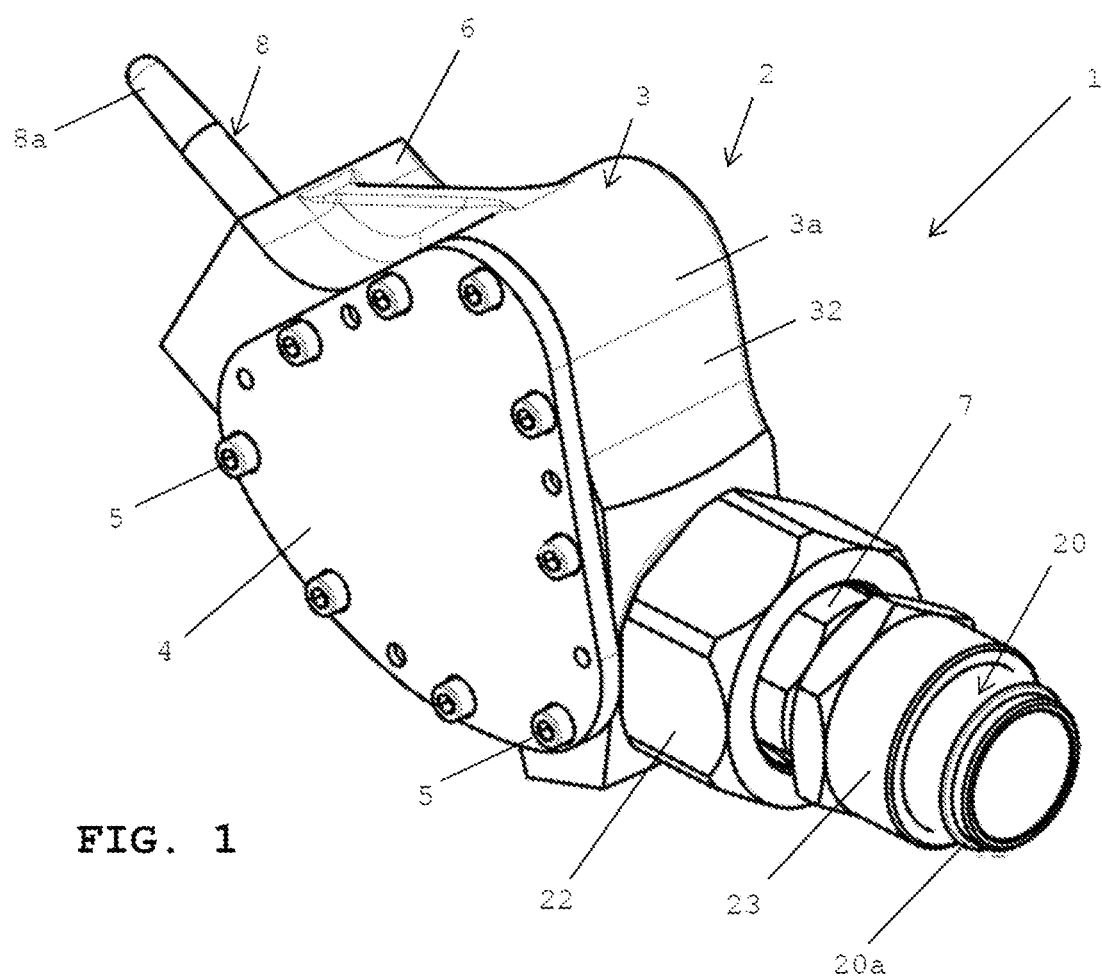
FIG. 1 is a perspective view of the drive transmission device for brakes according to the present invention.
Figure 2:
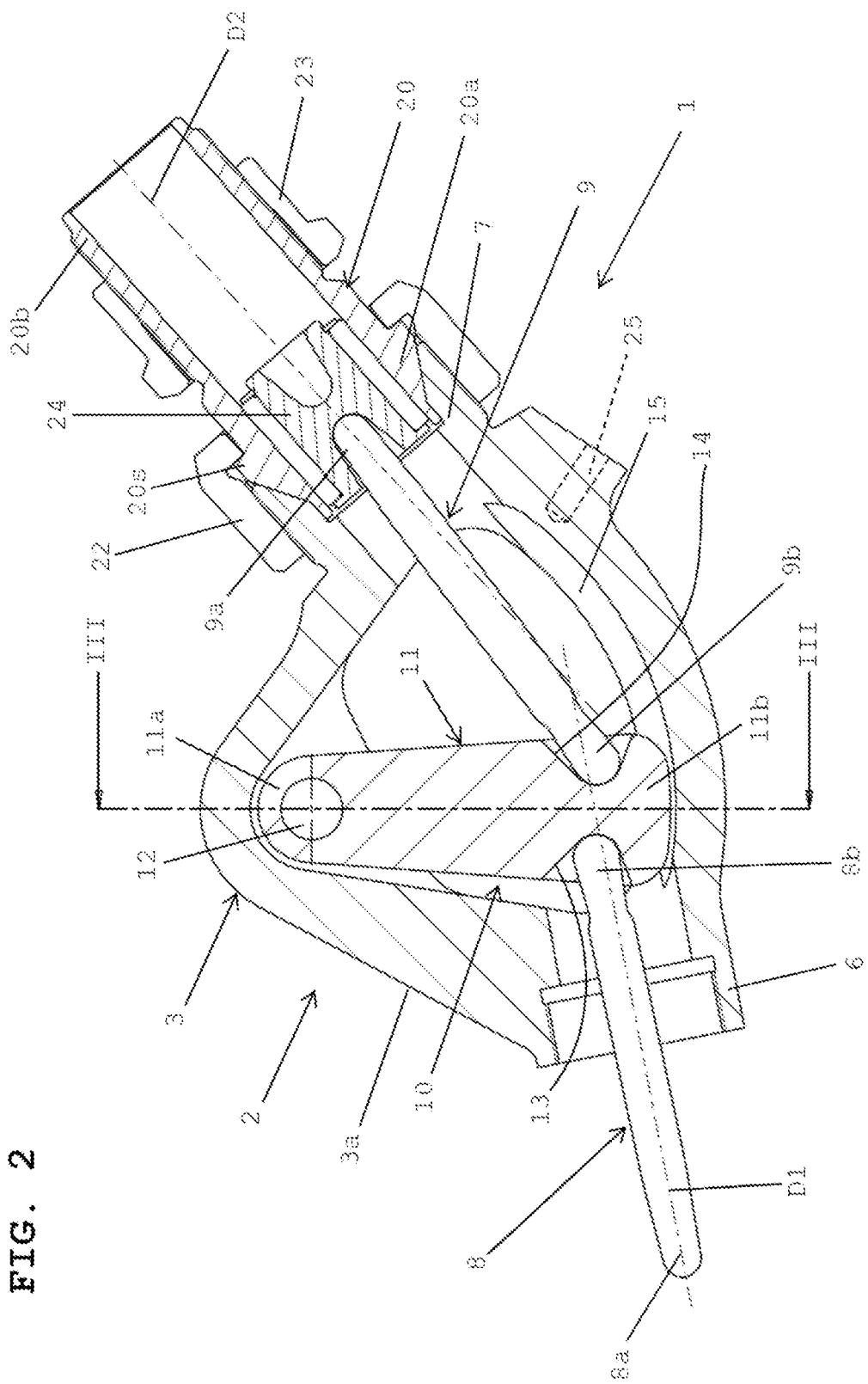
FIG. 2 is a view according to a longitudinal section of the device of FIG. 1.
Figure 3:
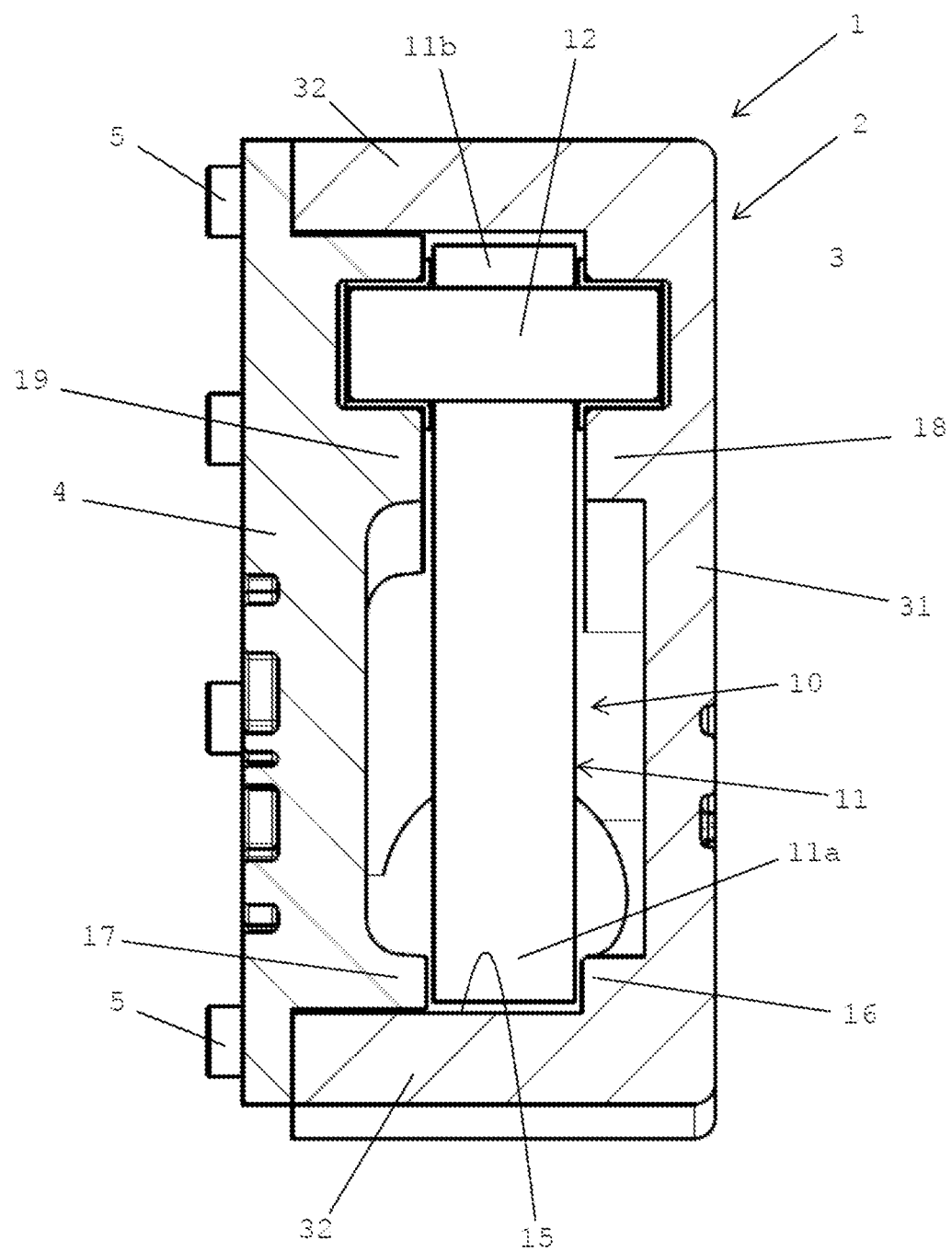
FIG. 3 is a section view of the device of FIG. 1 according to a plane III-III of FIG. 2.
Figure 4:
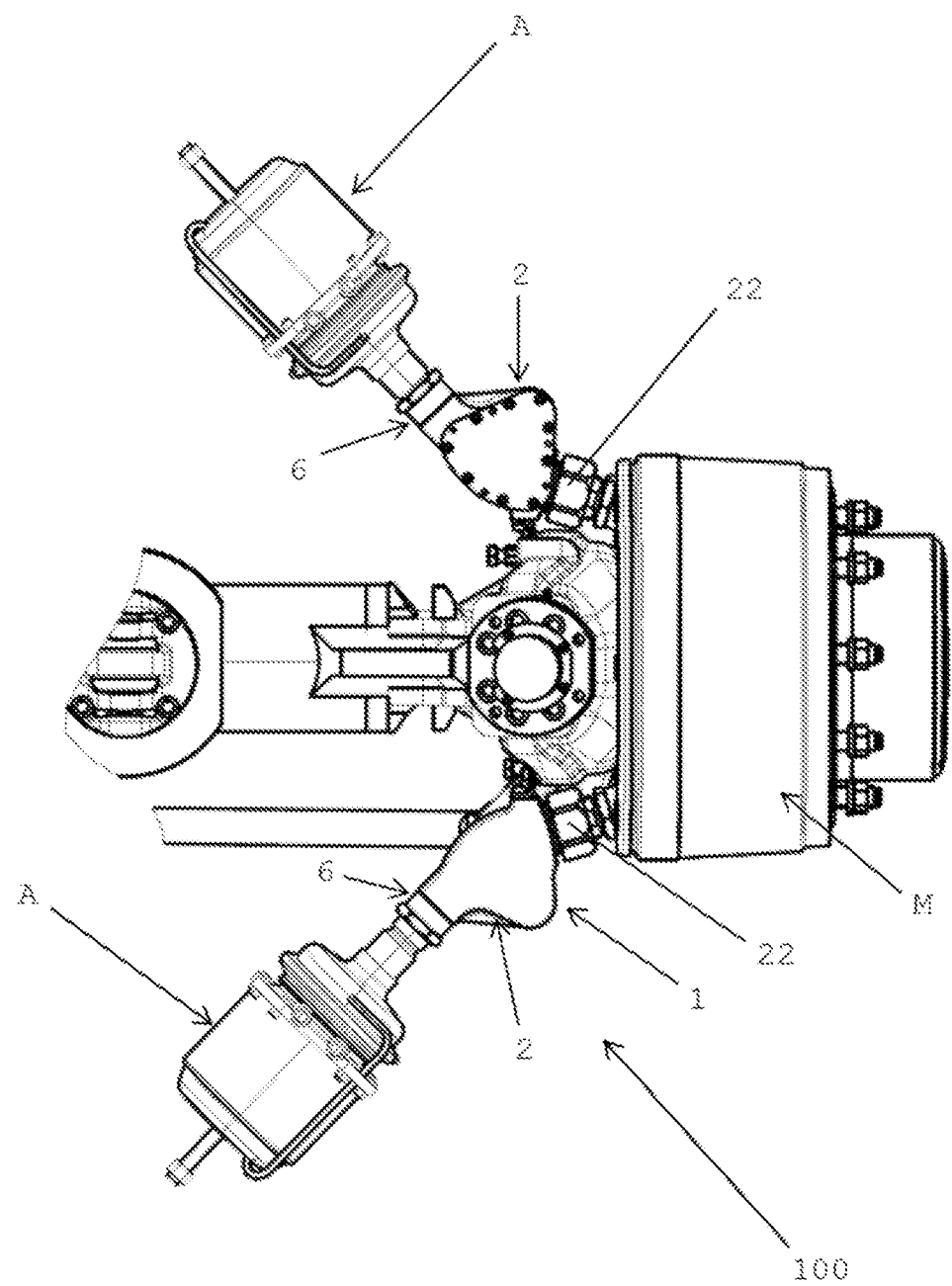
FIG. 4 is a partial plan view of an axle comprising two devices according to FIG. 1.

With reference to the appended figures, a drive transmission device for brakes in accordance with the present invention is denoted in its entirety by the reference number 1.

The device 1 is fitted between an actuator "A" of a brake (not shown) and the brake itself, contained in a hub "M" of a wheel of an axle 100 used, for example, in an agricultural machine or an earth-moving machine.

Within the scope of the present invention, the brake is a drum brake driven linearly by a wedge. In other words, the drum brakes of this type comprise an actuating member (not shown), for example a peg, which acts by moving the jaws against the drum when the actuating member is moved linearly along an actuating direction of the brake.

The device 1 comprises a frame 2. In the preferred embodiment, the frame 2 comprises a box-like body 3 that defines inside an accommodating compartment of the elements of the device 1. Further, the frame 2 comprises a cover 4 fixed reversibly to the box-like body 3 to close the box-like body 3. Preferably, the cover 4 is a plate. Still more preferably, the cover 4 is a flat plate.

Fixing means 5 is used to fix reversibly the cover 4 to the box-like body 3. For example, the fixing means 5 comprises bolts. In alternative embodiments, other types of reversible fixing means can be used.

In other words, the cover 4, once removed, enables the inside of the box-like body 3 to be accessed easily during the fitting step or in a subsequent inspection and maintenance step.

The box-like body 3 comprises a central portion 3a. The central portion 3a has an opening closed by the cover 4. Preferably, the central portion 3a comprises a preferably flat base wall 31, and side walls 32 that delimit the accommodating compartment.

According to what has been illustrated, the cover 4 is arranged parallel to the base wall 31. Further, the box-like body 3 comprises a first tubular section 6 connected to the central portion 3a, at the side wall, and extending parallel to a first direction D1. Further, the box-like body 3 comprises a second tubular section, or conduit, 7 connected to the side wall of the central portion 3a in a position opposite the first tubular section 6 and extending parallel to a second direction D2.

The first direction D1 and the second direction D2 are tilted with respect to one another. Preferably, an angle between the first D1 and the second direction D2 can be comprised between 0° and 45°. It should be noted that in alternative embodiments this angle can be greater than 45°. In the embodiment illustrated merely by way of example, the angle is substantially equal to 30°.

Further, the device 1 comprises a first rod 8 that is substantially movable along the first direction D1 and arranged at least partially inside the first tubular section 6. In detail, the first rod 8 has a first end 8a that, in use, is fixed to the actuator "A" and a second end 8b, opposite the first end 8a.

Further, the device 1 comprises a second rod 9 substantially movable along the second direction D2 and arranged at least partially inside the second tubular section 7.

In detail, the second rod 9 has a first end 9a that, in use, is connected to the brake actuating member. The second rod 9 further comprises a second end 9b, opposite the first end 9a.

The first 8 and the second rod 9 are substantially cylindrical.

According to the invention, the device 1 further comprises an oscillating element 10 having a first portion that is rotatably constrained to the frame 2 and a second portion movable along a circumferential arc trajectory.

According to what has been illustrated, the second ends 8b, 9b of the first 8 and of the second rod 9 are connected to the second portion of the oscillating element 10 in such a manner that the first 8 and the second rod 9 move integrally with the oscillating element 10.

It should be noted that the first end 8a of the first rod 8 moves, in use, integrally with a stem of the actuator "A". This first end 8a thus moves along a rectilinear direction parallel to the first direction D1 and to a driving direction of the actuator "A".

The second end 8b of the first rod 8 moves along the circular arc trajectory plotted by the movement of the oscillating element 10.

The first end 9a of the second rod 9 moves, in use, integrally with the brake actuating member. This first end 9a thus moves along a rectilinear direction parallel to the second direction D2.

The second end 9b of the second rod 9 moves along the circular arc trajectory plotted by the movement of the oscillating element 10.

Preferably, the oscillating element 10 comprises a bar 11 having a first end 11a, which defines the first portion of the oscillating element 10, and a second end which defines the second portion of the oscillating element 10.

The bar 11 has an elongated shape along a direction of prevalent extent. In detail, the bar 11 is substantially trapezoidal-shaped. In other words, the width of the bar 11 at the first end 11a is smaller than the width at the second end 11b.

The first end 11a of the bar 11 is rounded. The first end 11a of the bar 11 is constrained to the frame 2 by means of a pin 12. In detail, the pin 12 has an end constrained to the box-like body 3 and an opposite end constrained to the cover 4, preferably by means of a bush in each coupling.

The bar 11 is arranged inside the accommodating compartment of the box-like body 3 so as to be able to move by oscillating on a movement plane parallel to the cover 4.

Advantageously, the first 8 and the second rod 9 are connected to the bar 11 by contact. In other words, the second ends 8b, 9b of the first 8 and of the second rod 9 are in contact with a portion at the second end 11b of the bar 11.

This enables the aforesaid connection to be made simply and inexpensively. Further, during the fitting step, this coupling is achieved very fast.

It should also be noted that this type of coupling ensures great reliability of the device 1. In fact, the absence of constraining means limits the possibility of breakages or faults.

Lastly, this coupling by contact permits effective transmission of the forces between the first 8 and the second rod 9 and the bar 11, thus increasing transmission efficiency.

Preferably, the bar 11 has a first 13 and a second seat 14, obtained at the second end 11b of the bar 11. In other words, the first 13 and the second seat 14 are cavities made in the portion at the second end 11b respectively facing the first 6 and the second tubular section 7.

In this manner, the second end 8b of the first rod 8 lies in the first seat 13 and the second end 9b of the second rod 9 lies in the second seat 12.

In this manner undesired displacements of the second ends 8b, 9b with respect to the bar 11 are avoided, thus preventing losses of functionality of the device 1.

Preferably, the first 13 and/or the second seat 14 have a respective contact portion with the first 8 and/or the second rod 9 that is at least partially spherical. Even more preferably, both the contact portions of the seats 12, 13 are at least partially spherical.

Similarly, the second ends 8b, 9b of the first 8 and/or of the second rod 9 have a respective contact portion with the first 13 and/or the second seat 14 that is at least partially spherical. Even more preferably, both the contact portions of second ends 8b, 9b of the first 8 and of the second rod 9 are partially spherical.

It should in fact be noted that, during use of the device 1, there is a relative rotation between the first 8 and the second rod 9 and the bar 11, and particularly between the second ends 8b, 9b of the rods 8, 9 and the bar 11.

This relative rotation generates friction between the contact portions of the second ends 8b, 9b of the rods 8, 9 and the contact portions of the seats 12, 13 afforded in the bar 11.

As the contact portions are at least partially spherical in shape, the friction arising from relative movements between the rods 8, 9 and the bar 11 in the movement plane of the bar 11 is significantly reduced.

Consequently, the coupling in contact between the rods 8, 9 and the bar 11 is significantly facilitated and the efficiency of the transmission of the forces is improved.

It should also be noted that the spherical contact coupling disclosed above enables direct actions to be discharged suitably orthogonally onto the movement plane of the bar 11. Such actions are, in fact, undesirable and derive from stresses to which the machine is subjected during use. In other words, the spherical contact coupling disclosed above avoids excessive stiffening of the device 1. Further, this type of contact is defined as "self-centring". In other words, applying an external force causes the rods 8, 9 to be aligned on the movement plane of the bar 11, minimising the orthogonal stresses.

Still with reference to the spherical contact coupling disclosed above, it should also be noted that the first 8 and the second rod 9 each have a respective portion at the second ends 8, 9b in which a groove is made. This groove is made by countersinking locally to the inside the side cylindrical surface of the rods 8, 9 themselves, so as to reduce the diameter thereof locally.

In this manner, contact is prevented between the material surfaces of the rods 8, 9 with the seats 13, 14 outside the respective contact portions.

According to a further aspect of the invention, the frame 2 has a hollow 15 arranged at the second end 11b of the bar 11. In other words, the hollow 15 is afforded in the frame 2 in a position opposite the pin 14 with respect to the bar 11.

This hollow 15 extends along a circular arc trajectory corresponding to the trajectory of the second end 11b of the bar 11. The hollow 15 is coplanar with the movement plane of the bar 11. The second end 11b of the bar 11 is at least partially inserted into the hollow 15 and slides thereupon during movement of the bar 11.

It should be noted that, in a normal operating condition, the second end 11b of the bar 11 never comes into contact with the walls of the frame 2 that define the hollow 15, during movement of the bar 11.

Nevertheless, the hollow 15 is useful for maintaining the bar 11 in position and enabling movement thereof along the movement plane in the event of an emergency. In fact, if the pin 12 breaks and the rotating coupling of the bar 11 with respect to the frame 2 fails, the no longer supported bar 11 falls into the hollow 15 that, in this particular case, acts as an emergency support. In other words, the hollow 15 enables the bar 11 to maintain position on the movement plane even if detached from the frame 2.

Further, if it is necessary to drive the brake even in the aforesaid emergency condition, the bar 11, pushed by the first 8 or by the second rod 9, is able to move along the movement plane inasmuch as it is supported and guided by the hollow 15.

In the embodiment illustrated, the box-like body 3 and the cover 4 have respective shoulders 16, 17 arranged at the second end 11b of the bar 11 to define there between the hollow 15.

The shoulders 16, 17 face one another and extend towards one another along a direction that is perpendicular to the movement plane of the bar 11.

Advantageously, the fact that the shoulders 16, 17 are respectively made on the box-like body 3 and on the cover 4 enables fitting of the device 1 and subsequent maintenance thereof to be simplified significantly without any need to check the alignment of the bar 11 with respect to the hollow 15 during the fitting step.

During fitting, in fact, the bar 11 is positioned in the box-like body 3 such that the second end 11b thereof is on the shoulder 16 of the box-like body 3.

By fitting the cover 4 on the box-like body 3, the shoulder 17 of the cover 4 will be arranged on the second end 11b of the bar 11, enclosing the bar 11 in the hollow 15.

Preferably, the box-like body 3 and the cover 4 have respective additional shoulders 18, 19 arranged at the first end 11a of the bar 11. The pin 12 is fitted on the box-like body 3 and on the cover 4 at the additional shoulders 18, 19.

These additional shoulders 18, 19 further contribute to maintaining in the correct position the bar 11 also following strong stresses that are transverse to the movement plane.

According to the preferred embodiment, the device 1 further comprises a coupling sleeve 20 configured to be connected to the brake actuating member, according to a method that will be disclosed below.

The coupling sleeve 20 is connected to the second tubular section (or conduit) 7 coaxially. In use, the second rod 9 moves at least partially also inside the coupling sleeve 20.

Advantageously, the coupling sleeve 20 is associated with the second tubular section 7 by conical coupling. In other words, the coupling sleeve 20 has a first end 20a having a convex frustoconical surface that couples with a corresponding end of the second tubular section 7 that has a convex frustoconical surface.

Advantageously, the conical coupling enables the second tubular section 7 to be connected to the coupling sleeve 20 (already fitted on the brake) quickly and simply, thus permitting self-centring of this coupling.

Further, the conical coupling enables the rest of the device 1 to be fitted easily and rapidly to the sleeve 20 in accordance with any desired and suitable orientation.

It is further possible to modify this orientation also after fitting, permanently or temporarily, for needs arising from maintenance or inspection of the device 1.

For this purpose, the device 1 further preferably comprises a locking member 21 associated with the coupling sleeve 21 to fix the coupling sleeve 20 reversibly to the second tubular section 7.

Preferably, the locking member 21 comprises a threaded ring nut 22 associated with the coupling sleeve 20 and screwed outside the second tubular section 7. In detail, the internally threaded ring nut 22, is fitted coaxially to the sleeve 20 and retained by a retaining shoulder 20s thereof. After coupling the second tubular section 7 with the sleeve 20, the ring nut 22 is screwed onto an outer threaded portion of the second tubular section 7 to lock this coupling.

It should be noted that in order to modify (permanently or temporarily) the orientation of the device 1 with respect to the brake, it is sufficient to loosen the ring nut 22 by unscrewing the ring nut 22 and rotating the device 1. Lastly, by tightening the ring nut 20, this new position is maintained for all the time necessary.

Referring back to the function of the coupling sleeve 20, it should be noted that the coupling sleeve 20 is preliminarily connected to the brake at a second end 20b thereof in a known manner.

An auxiliary threaded ring nut 23 is clamped against the brake, acting as a lock nut.

Additionally, the device 1 further comprises a slider 24 that is movable along the second tubular section 7 and the sleeve 20 parallel to the second direction D2.

The slider 24 has a first housing 24a to house the first end 9a of the second rod 9 and a second housing 24b for housing the brake actuating member, making in this manner the connection of the device 1 with the brake.

In use, once the device 1 is fitted to the axle 100, the actuator "A" exerts a force in the first direction D1, transferring the force to the first rod 8.

The first rod 8 exerts a thrust on the bar 11, which is thus rotated. During displacement thereof, the bar 11 pushes the second rod 9 along the second direction D2.

The second rod 9 can thus act on the brake actuating member.

When the actuator "A" is deactivated, a return elastic force of the brake pushes the aforesaid components with identical and opposite forces to an initial configuration.

Lastly, the device 1 has at least one hole 25 made in the box-like body 3 at a flat portion of a side wall 32 thereof. Preferably, the device 1 comprises two or more holes 25. The holes 25 can be used to screw a stop (not shown) to the box-like body 3 of the device 1. This stop is further fixed to a fixed point of the axle 100.

The invention achieves the object aimed at.

It should in fact be noted that as the first D1 and the second direction D2 are tilted with respect to one another, it is possible to divert the direction of the actuator "A" with respect to the brake to move the actuator "A" far from the other components of the axle to enable the curvature radius of the machine to which the device is fitted to be reduced.

The invention claimed is:

1. A drive transmission device for a brake comprising:
a frame (2);
a first rod (8) movable along a first direction (D1) and having a first end (8a) configured to be connected to an actuator (A) and a second end (8b), opposite the first (8a);
a second rod (9) movable along a second direction (D2), inclined relative to the first direction (D1), and having a first end (9a) configured to be connected to a brake actuating member and a second end (9b), opposite the first (9a);
an oscillating element (10) having a first portion rotatably constrained to the frame (2) and a second portion movable along a circumferential arc trajectory;
the second ends (8b, 9b) of the first rod (8) and the second rod (9), respectively, being connected to the second portion of the oscillating element (10), wherein the device is configured such that, in use, the first rod (8) moves along the first direction (D1) as a result of a force (a) applied by the actuator (A) to the first end (8a) of the first rod (8) and (b) in a direction towards the second end (8b) of the first rod (8) and towards the second portion of the oscillating element (10), which movement of the first rod (8) causes the second end (8b) of the first rod (8) to push against the second portion of the oscillating element (10), which causes the second portion of the oscillating element (10) to move along the circumferential arc trajectory, which causes the second rod (9), acted on by the second portion of the oscillating element (10), to move along the second direction (D2) towards the brake actuating member;
wherein the second portion of the oscillating element (10) has a first hollowed out cavity which defines a first seat (13) and a second hollowed out cavity which defines a second seat (14), the second end (8b) of the first rod (8) being seated in the first seat (13), the second end (9b) of the second rod (9) being seated in the second seat (14) such that each second end (8b, 9b) is effectively constrained to remain seated in its respective seat during operation of the drive transmission device, and wherein the second end (8b) of the first rod (8) is constrained by the first seat (13) to move in a circular arc trajectory when the second portion of the oscillating element (10) moves along the circumferential arc trajectory;
wherein the oscillating element (10) comprises a bar (11) having a first end (11a), which defines the first portion of the oscillating element (10), and a second end (11b), which defines the second portion of the oscillating element (10); wherein, during operation, the movement of the distal end of the second end (11b) of the oscillating element (10) defines a first arc; wherein the frame (2) defines a hollow (15) which forms a bottom located adjacent said distal end, said hollow (15) extending along a second arc corresponding to said first arc so that, during operation, the distal end moves adjacent the hollow (15) but does not contact the hollow (15).

2. The device according to claim 1, characterised in that the frame (2) comprises a conduit (7) coaxial to the second direction (D2) for accommodating the second rod (9); the device further comprising a coupling sleeve (20) configured to be connected to the brake actuating member; the coupling sleeve (20) being associated with the conduit (7) by means of a conical coupling.

3. The device according to claim 2, characterised in that it further comprises a locking member (21) associated with the coupling sleeve (20) so as to reversibly fix the coupling sleeve (20) to the conduit (7).

4. The device according to claim 3, wherein the locking member (21) comprises a threaded locknut (22) associated with the coupling sleeve (20) and screwed externally to the conduit (7).

5. The device according to claim 1, wherein the frame (2) comprises a first shoulder (16) and a second shoulder (17) both located adjacent the hollow (15); the hollow (15) being located between the first and second shoulders (16, 17), the shoulders (16, 17) defining an arcuate slot at the bottom of which is the hollow (15).

6. The device according to claim 5, wherein, during operation, the hollow (15) and the first and second shoulders (16, 17) maintain the distal end in position and, in case the oscillating element (10) becomes detached from the frame (2), the oscillating element (10) is able to be pushed by the first rod (8) or the second rod (9) and thereby move along, and be guided by, the arcuate slot.

7. The device according to claim 5, wherein the frame (2) comprises a body (3) and a removable cover (4), wherein the body (3) defines the first shoulder (16) and the cover (4) defines the second shoulder (17).

8. The device according to claim 7, wherein the body (3) defines a third shoulder (18) and the cover (4) defines a fourth shoulder (19), the third and fourth shoulders (18, 19) being located (a) adjacent the first portion of the oscillating element (10) and (b) beneath and adjacent to a pin (12) which attaches the bar (11) to the frame (2), the third and fourth shoulders (18, 19) further contributing to maintain the bar (11) in a correct position during operation of the device.

9. The device according to claim 8, wherein, during operation, the hollow (15) and the first and second shoulders (16, 17) maintain the distal end in position and, in case the oscillating element (10) becomes detached from the frame (2), the oscillating element (10) is able to be pushed by the first rod (8) or the second rod (9) and thereby move along, and be guided by, the arcuate slot.

10. The device according to claim 9, wherein the drive transmission device is sized and configured to be fitted between (a) an actuator for a first brake in an agricultural machine or an earth-moving machine and (b) the first brake contained in a hub of a wheel of an axle in said agricultural machine or said earth-moving machine.

11. The device according to claim 10, wherein said first brake is a drum brake, wherein the body (3) contains the first rod (8) and the second rod (9) and the bar (11), and wherein the body (3) defines a hole (25) located at a flat portion of a side wall (32) of the body (3), the hole (25) being located and adapted to receive a stop which is sized and adapted to be fixed to a fixed point of said axle.

12. The device according to claim 11, wherein the frame (2) comprises a conduit (7) coaxial to the second direction (D2) for accommodating the second rod (9); the device further comprising a coupling sleeve (20) configured to be connected to the brake actuating member; the coupling sleeve (20) being associated with the conduit (7) by means of a conical coupling, and wherein the device further comprises a locking member (21) associated with the coupling sleeve (20) so as to reversibly fix the coupling sleeve (20) to the conduit (7).

13. The device according to claim 1, wherein the drive transmission device is sized and configured to be fitted between (a) an actuator for a first brake in an agricultural machine or an earth-moving machine and (b) the first brake contained in a hub of a wheel of an axle in said agricultural machine or said earth-moving machine.

14. The device according to claim 13, wherein said first brake is a drum brake.

15. The device according to claim 13, wherein the frame (2) comprises a body (3), containing the first rod (8) and the second rod (9) and the bar (11), and a cover (4) reversibly connected to the body (3), and wherein the body (3) defines a hole (25) located at a flat portion of a side wall (32) of the body (3), the hole (25) being located and adapted to receive a stop which is sized and adapted to be fixed to a fixed point of said axle.

16. The device according to claim 1, characterised in that each of the first seat (13) and the second seat (14) has a respective portion in contact with the first rod (8) and the second rod (9), respectively, which is at least partially spherical; each of the second end (8b) of the first rod (8) and the second end (9b) of the second rod (9) has a respective portion in contact with the first seat (13) and the second seat (14), respectively, which is at least partially spherical.

17. The device according to claim 1, characterised in that the frame (2) comprises a body (3), containing the first rod (8) and the second rod (9) and the bar (11), and a cover (4) reversibly connected to the body (3).

18. The device according to claim 17, wherein the cover (4) is parallel to the plane of movement of the bar (11).

* * * * *